United States Patent [19]
Yamada et al.

[11] Patent Number: 5,003,436
[45] Date of Patent: Mar. 26, 1991

[54] METHOD AND APPARATUS FOR ASSEMBLING A HEADLIGHT

[75] Inventors: Kunihiko Yamada; Yukio Yonezawa; Katsutada Shirai, all of Shizuoka, Japan

[73] Assignee: Koito Manufacturing Co., Ltd., Tokyo, Japan

[21] Appl. No.: 441,015

[22] Filed: Nov. 24, 1989

[30] Foreign Application Priority Data

Nov. 24, 1988 [JP] Japan .................... 63-296857

[51] Int. Cl.⁵ .................... B60Q 1/00
[52] U.S. Cl. .................... 362/61; 362/420; 362/421
[58] Field of Search .................... 362/61, 66, 418, 419, 362/420, 421, 422

[56] References Cited

U.S. PATENT DOCUMENTS

| | | | |
|---|---|---|---|
| 3,823,314 | 7/1974 | Germany | 362/419 |
| 4,574,334 | 3/1986 | Igura | 362/66 |
| 4,772,029 | 1/1988 | Ahle | 362/66 |
| 4,845,598 | 7/1989 | Watanabe et al. | 362/418 |

FOREIGN PATENT DOCUMENTS 1488865 10/1977 United Kingdom .

Primary Examiner—Allen M. Ostrager
Assistant Examiner—Sue Hagarman
Attorney, Agent, or Firm—Browdy and Neimark

[57] ABSTRACT

A headlight apparatus including a lamp body having a recess being open in the front direction and a lens covering the front opening of the recess, and a reflective mirror tiltably mounted on the lamp body. Two spaced apart adjust shafts are respectively supported rotatively on the lamp body with the rear end portions thereof projecting from the rear surface of the lamp body, and screw-thread portions are formed respectively on the front portions of the adjust shafts to engage with nuts respectively. The nuts have respectively on the outer side surfaces resilient retaining pieces for snappingly engaging with respective mounting members which are mounted on the reflective mirror. A ball joint connection is formed between the reflective mirror and the lamp body at the position spaced apart respectively from respective adjust shafts.

9 Claims, 13 Drawing Sheets

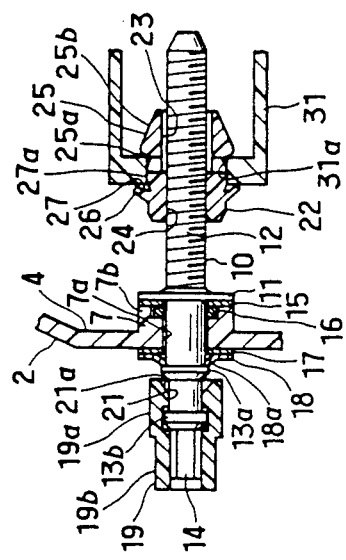
FIG. 4A
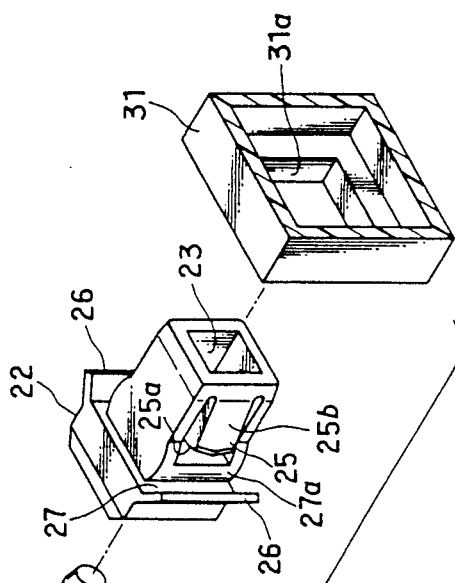
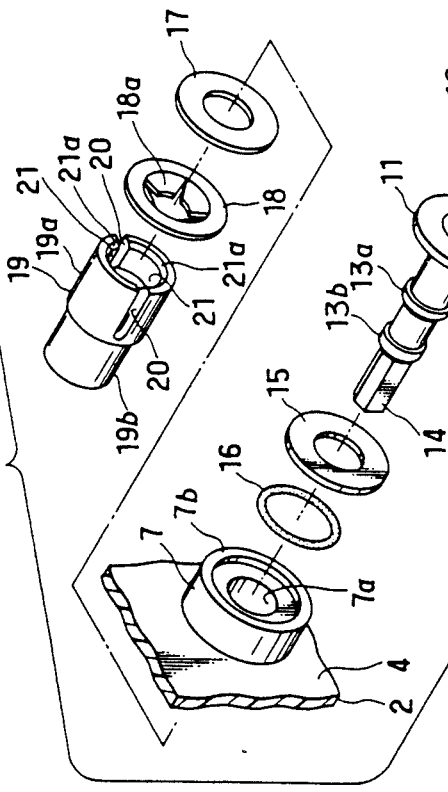
FIG. 4B

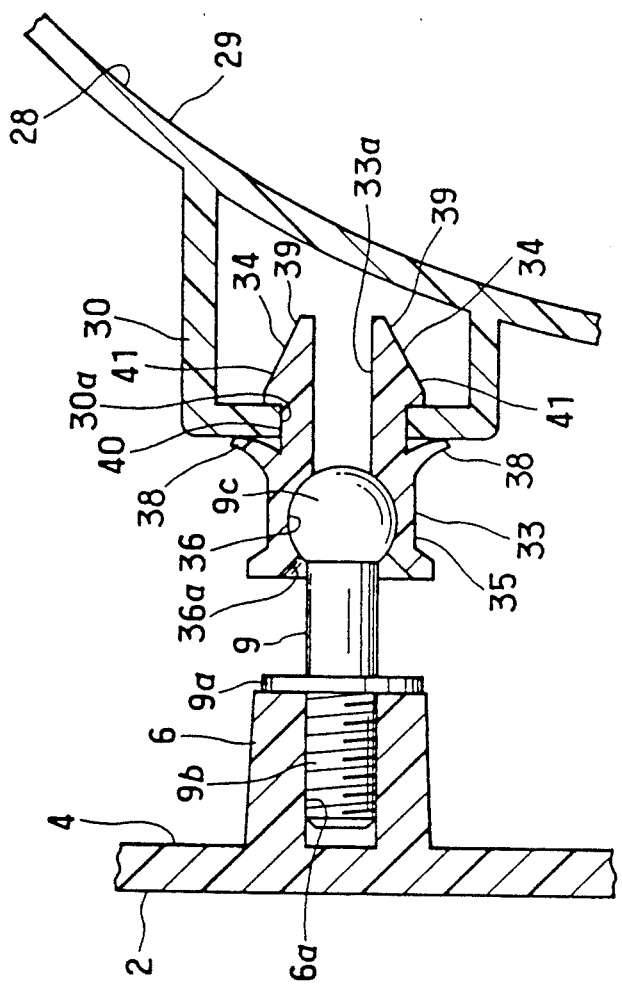

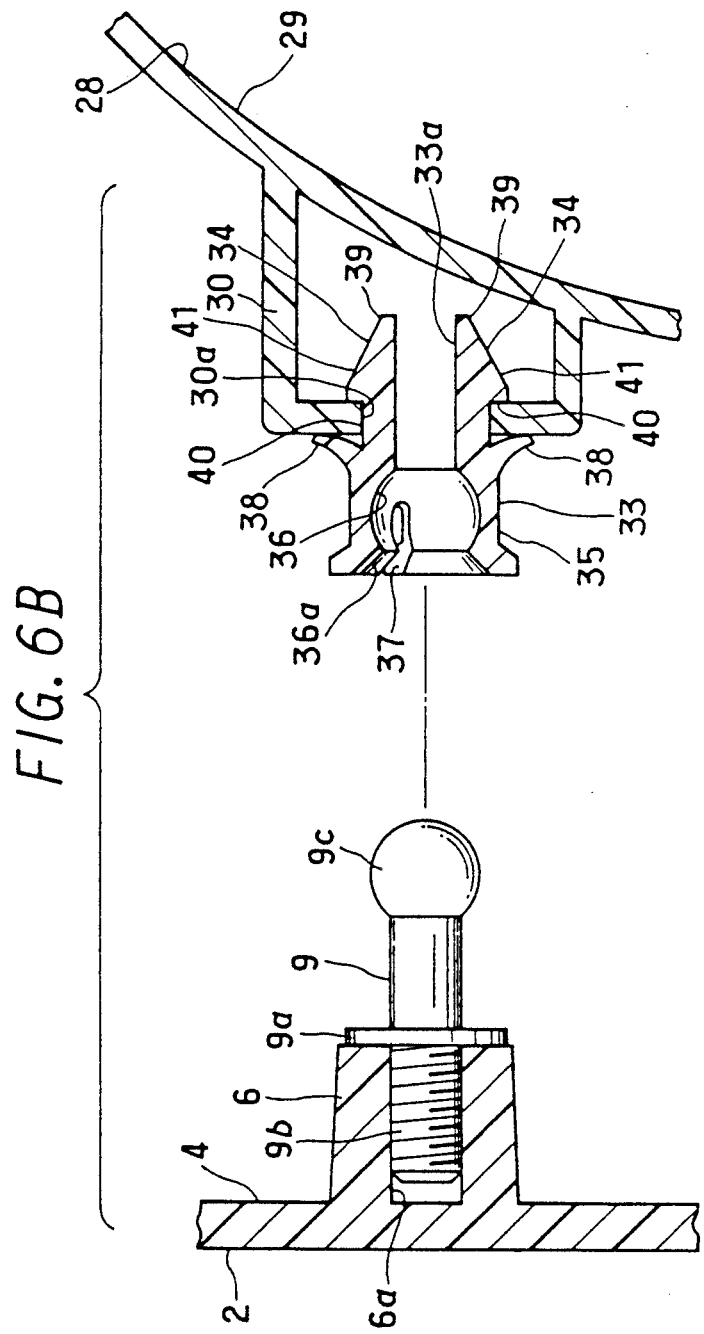

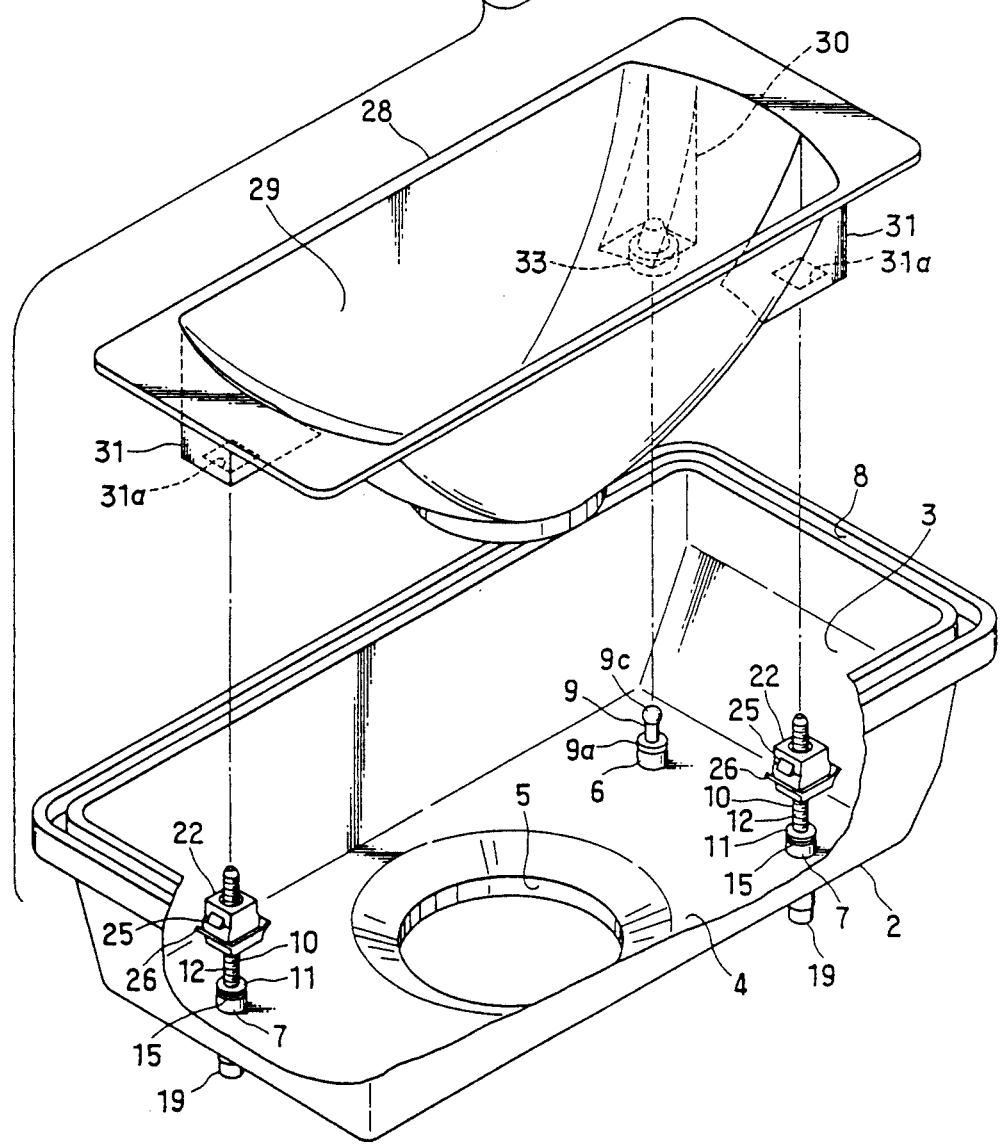

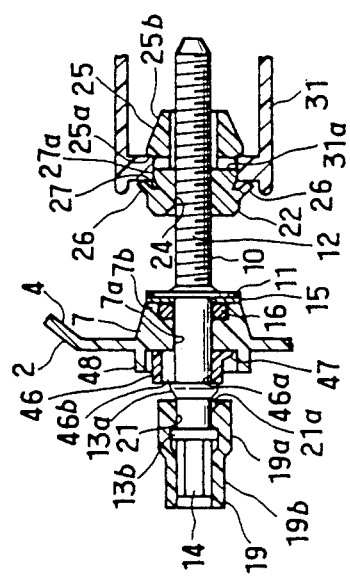
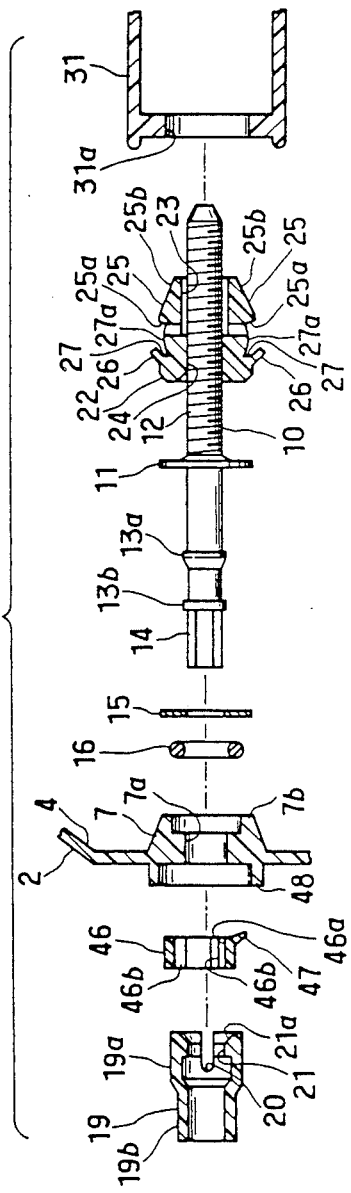
FIG. 8A
FIG. 8B

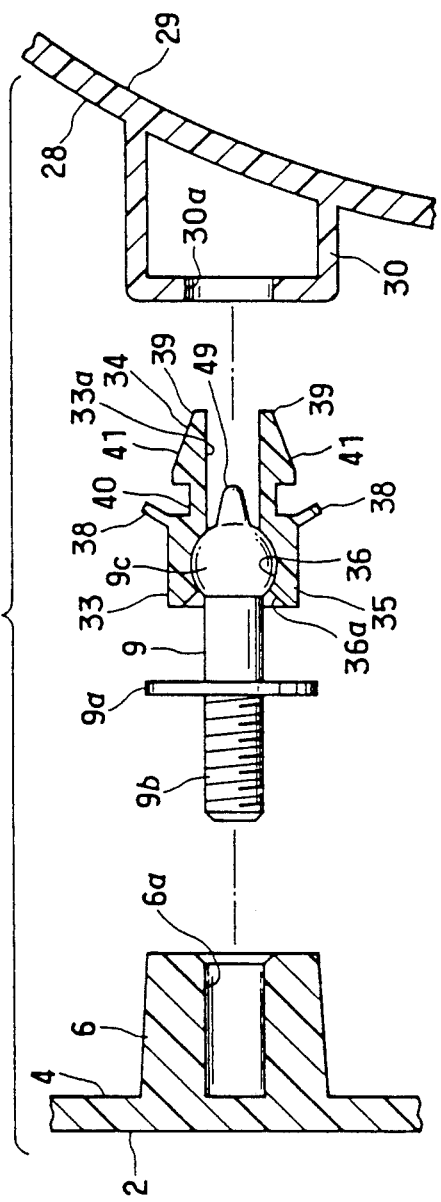
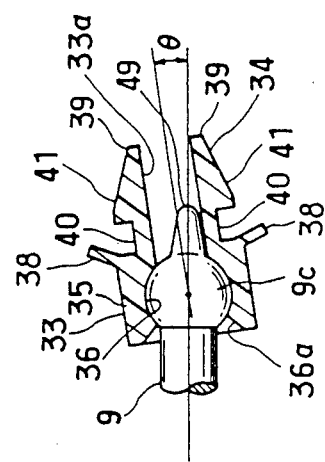
FIG. 9
FIG. 10

METHOD AND APPARATUS FOR ASSEMBLING A HEADLIGHT

FIELD OF THE INVENTION

The present invention relates to a novel method for assembling a headlight for use in a vehicle such as an automobile and the like and, particularly to a method and apparatus for easily assembling a reflective mirror tiltably on a lamp body.

DESCRIPTION OF PRIOR ART

FIG. 11 through FIG. 13 show one example a of prior art automobile headlight having a reflective mirror tiltably mounted in a lamp space which is defined by a lamp body and a lens.

Shown at b is the lamp body formed of a synthetic resin material and defines a recess c which opens in the forward direction. A lens d is mounted on the lamp body b to cover the recess c.

A reflective mirror e is tiltably disposed in a lamp space f which is defined between the lamp body b and the lens d.

The reflective mirror e is supported on the lamp body b at three points A, B and C.

At the point A the reflective mirror e is supported on the lamp body b through a rotatable support mechanism g. The mechanism g comprises a support shaft h mounted on the lamp body b and a receptacle member l supported on the reflective mirror e. The support shaft h includes a spherical portion i on the front end and screw-thread portion j on the rear half portion which is threaded in a boss seat k which is formed on the inner surface of the lamp body b. The receptacle member l has a spherical recess m which opens in the rear direction.

The spherical portion i of the support shaft h engages with the spherical recess m of the receptacle member l, thereby the mirror e is rotatably connected to the lamp body b.

At the points B and C, the mirror e is connected to the lamp body b through space adjustment mechanism n and n respectively. The space adjustment mechanism n and n consist respectively of adjustment shafts o and o being rotatably supported on the lamp body b and nuts r and r being supported on the reflective mirror e.

The adjustment shaft o is rotatably supported on the lamp body b at the position near to its head portion p and, has a screw-thread portion q extending on the front side of the head portion p. The head portion p projects rear side of the lamp body b. The screw-thread portion q engages with the nut r.

When the adjustment shaft o at the point B or C is rotated the screw-thread portion q of the adjust shaft o is screwed into or out of corresponding nut r according to the direction of the rotation so that the space between the reflective mirror e and the lamp body b at the point B or C changes, whereby the reflective mirror e tilts around a tilt axis which is a straight line connecting the point A and another point C or B.

FIG. 13 is a view showing the condition just prior to assemble the reflective mirror e with the lamp body b of the headlight a.

The support shaft h and two adjust shafts o and o are supported on the lamp body b and the receptacle member l and two nuts r and r are supported on the reflective mirror e.

In assembling the the reflective mirror e with the lamp body b, the spherical portion i of the support shaft h is applied to the recess m in the receptacle member l and the tip ends of the screw-thread portions q and q of the adjust shafts o and o are applied in the openings in the nuts r and r. Then, the screw-thread portions q and q are threaded respectively into the nuts r and r until the positional relationship between the reflective mirror e and the lamp body b is generally parallel. At that condition, a portion of the mirror e supporting the receptacle member l is pushed in the rear direction so as to engage the spherical recess m with the spherical portion i of the support shaft h. The lamp body b is assembled with the reflective mirror e and is tiltable relative thereto.

According to above described assembling process, as shown in FIG. 13, the opening la of the recess m of the receptacle member l and the openings rb and rc of the nuts r and r respectively contact with the front end ia of the support shaft h and the front ends qb and qc of the screw-thread portions q and q of the adjust shaft o and o respectively.

However, the reflective mirror e takes the position generally parallel to the lamp body b when the screw-thread portions q and q are threaded into nuts r and r by the positions qb' and qc' respectively and, thus, at the initial condition, the reflective mirror e is inclined largely relative to the lamp body b. Further, it is required to fit the spherical portion i of the support shaft h with the spherical recess m of the receptacle member l after the adjust shafts o and o have been threaded into the nuts r and r by the positions qb' and qc' respectively. Therefore, the assembling process is very complicated and time consuming.

The present invention aims to solve above described problems and to provide a simple and reliable method for assembling the reflective mirror with the lamp body and an apparatus for attaining the method.

SUMMARY OF THE INVENTION

According to the invention, there is provided a method for assembling a headlight which includes a lamp body having a recess being open in the front direction and a lens covering the front opening of the recess, and a reflective mirror tiltably mounted on the lamp body, the method comprises steps of supporting rotatably two adjust shafts respectively on the lamp body with the rear end portions thereof projecting from the rear surface of the lamp body, mounting respectively on screw-thread portions of the adjust shafts nuts having on the outer side surfaces resilient portions respectively, mounting a support shaft having a spherical portion on the front end on the lamp body, supporting a receptacle member having a spherical recess opening in the rear direction on the reflective mirror, supporting two mounting members having mounting openings respectively on the reflective mirror, arranging the opening of the recess of the receptacle member to correspond the spherical portion of the support shaft and the mounting openings of the mounting members to correspond respectively the nuts, and pushing the reflective mirror in the rear direction so that the spherical portion of the support shaft is fitted in the spherical recess in the receptacle member and the nuts are respectively fitted and retained in the mounting openings of the mounting members, whereby the reflective mirror is mounted tiltably on the lamp body.

According to another feature of the present invention, there is provided a headlight apparatus including a lamp body having a recess being open in the front direction and a lens covering the front opening of the recess, and a reflective mirror tiltably mounted on the lamp body; wherein two spaced apart adjust shafts are respectively supported rotatively on the lamp body with the rear end portions thereof projecting from the rear surface of the lamp body; screw-thread portions are formed respectively on the front portions of the adjust shafts to engage with nuts respectively; the nuts have respectively on the outer side surfaces resilient retaining portions; a support shaft having a spherical portion on the front end is mounted on the lamp body at the position spaced from respective adjust shafts; the spherical portion is adapted to engage with a spherical recess in a receptacle member which is adapted to be mounted on the reflective mirror; and two mounting members respectively having mounting openings are supported on the reflective mirror, with the mounting openings being adapted to receive resiliently and retain the nuts respectively when the nuts are forcefully pushed into the mounting openings respectively.

Further, according to the invention, there is provided a headlight apparatus including a lamp body having a recess being open in the front direction and a lens covering the front opening of the recess, and a reflective mirror tiltably mounted on the lamp body, the apparatus is characterized in that two spaced apart adjust shafts are respectively supported rotatably on the lamp body with the rear end portions thereof projecting from the rear surface of the lamp body, that screw-thread portions are formed respectively on the front portions of the adjust shafts to engage with nuts respectively, that the nuts have respectively on the outer side surfaces resilient retaining means, that a support shaft having a spherical portion on the front end is mounted on the lamp body, that a receptacle member having a spherical recess and two mounting members having respectively mounting openings are supported on the reflective mirror, and that the mounting openings are adapted to receive resiliently and retain the nuts respectively when the nuts are forcively pushed into the mounting openings.

BRIEF DESCRIPTION OF THE DRAWINGS

Further objects and effects of the invention will become apparent from the following detailed description in conjunction with the drawings, in which:

FIG. 1 through FIG. 8 show a method according to a first embodiment of the present invention;

FIG. 1 is a front view of an automobile headlight;

FIG. 2 is a section view taken along line II—II of FIG. 1;

FIG. 3 is a section view taken along line III—III of FIG. 1;

FIG. 4A is an enlarged sectional view of an adjust shaft and a supporting mechanism;

FIG. 4B is an enlarged exploded view of FIG. 4;

FIG. 6A is an enlarged section view in the connected condition of a support shaft and a receptacle member;

FIG. 6B is an enlarged section view in the separated condition of the support shaft and the receptacle member;

FIG. 7 is a perspective view of the reflective mirror and the lamp body not being connected together;

FIG. 8A is an enlarged section view showing a modified construction of a lamp body and a lamp body support mechanism;

FIG. 8B is an exploded section view of FIG. 8A;

FIG. 9 is an enlarged section view of the essential portion showing a modified method according to a second embodiment of the present invention;

FIG. 10 is an enlarged exploded section view of FIG. 9;

DETAILED DESCRIPTION OF PREFERRED EMBODIMENTS

Figure 1:
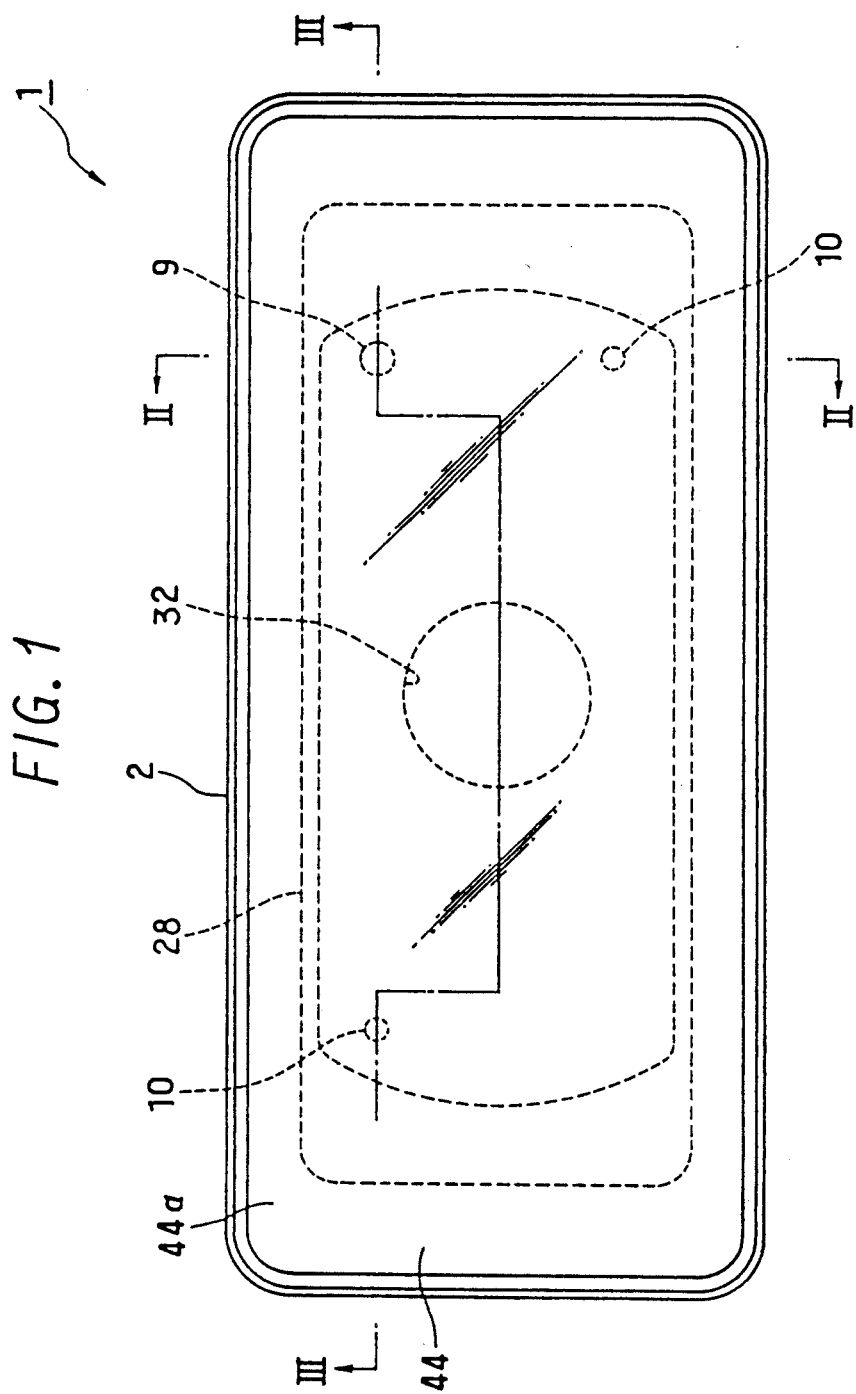

The first embodiment according to the invention shown in FIG. 1 through FIG. 8B includes an automobile headlight 1 which essentially consists of a lamp body 2, a lens 44 and a reflective mirror 29.

LAMP BODY (FIGS. 2~4, FIGS. 6~8)

The lamp body 2 is preferably formed of a synthetic resin material and has a recess 3 opening in the front direction and a rear wall 4 having an opening 5 in the central portion.

Figure 2:
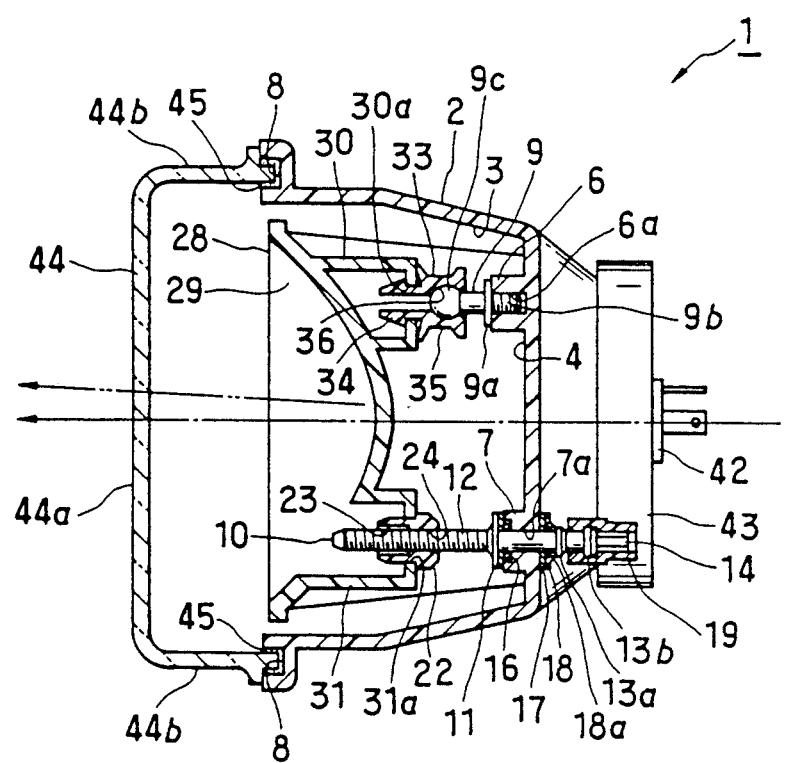
Figure 3:
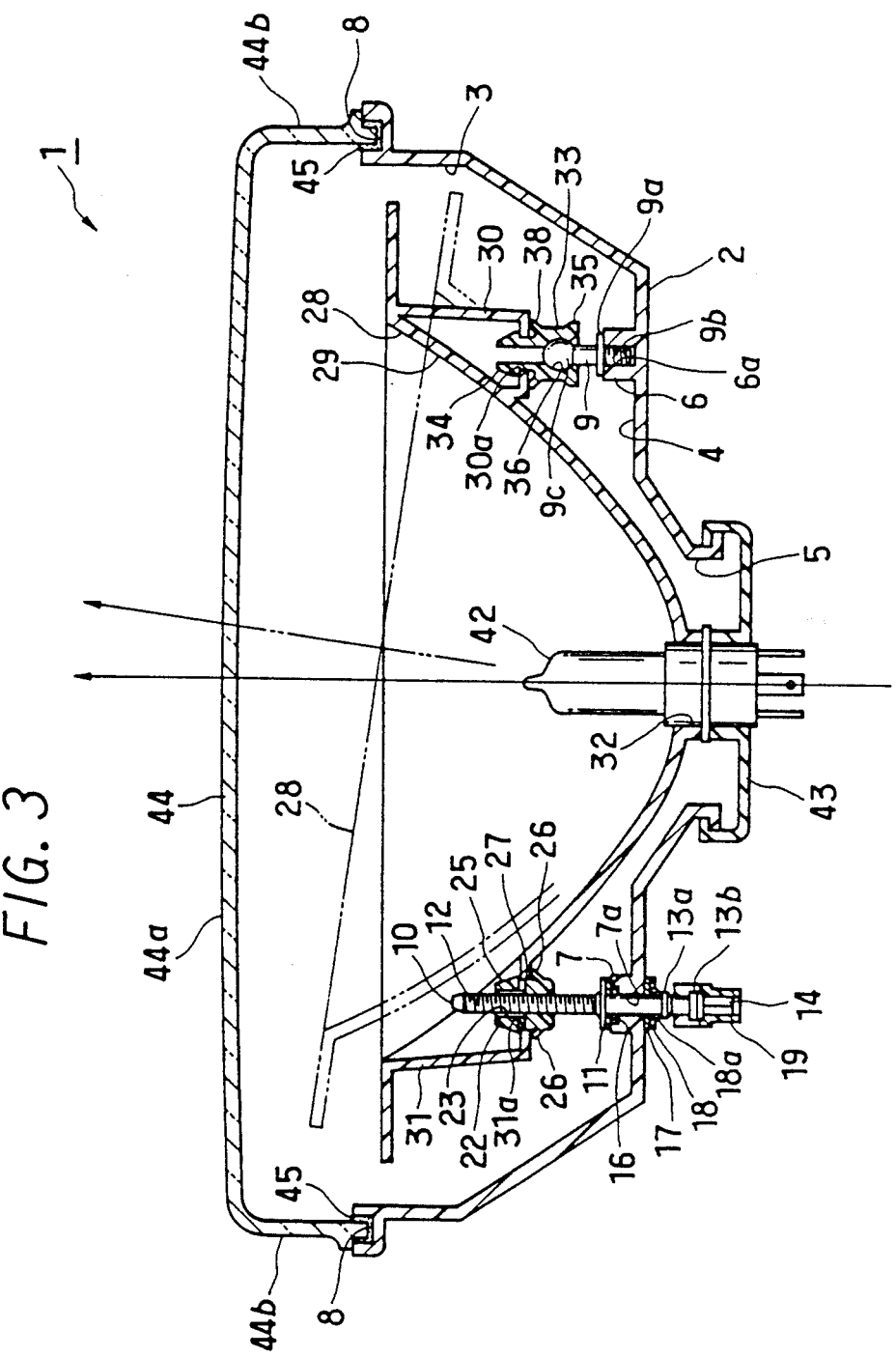
Figure 5A:
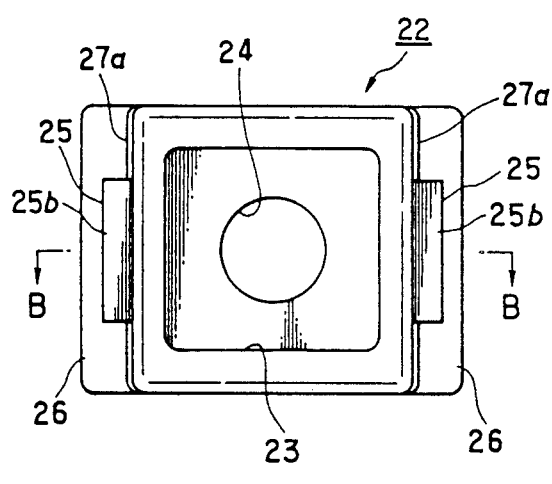
FIG. 5A is an enlarged front view of a nut.
Figure 5B:
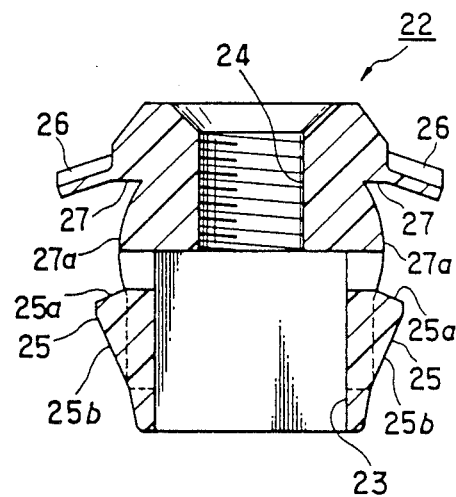
FIG. 5B is an enlarged section view taken along line B—B in FIG. 5A.
Figure 5C:
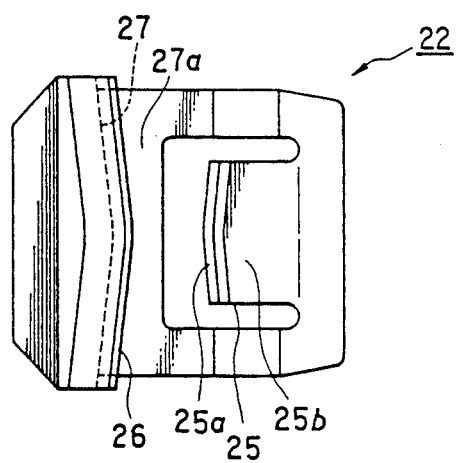
FIG. 5C is an enlarged side view of the nut of FIG. 5A.
Figure 11:
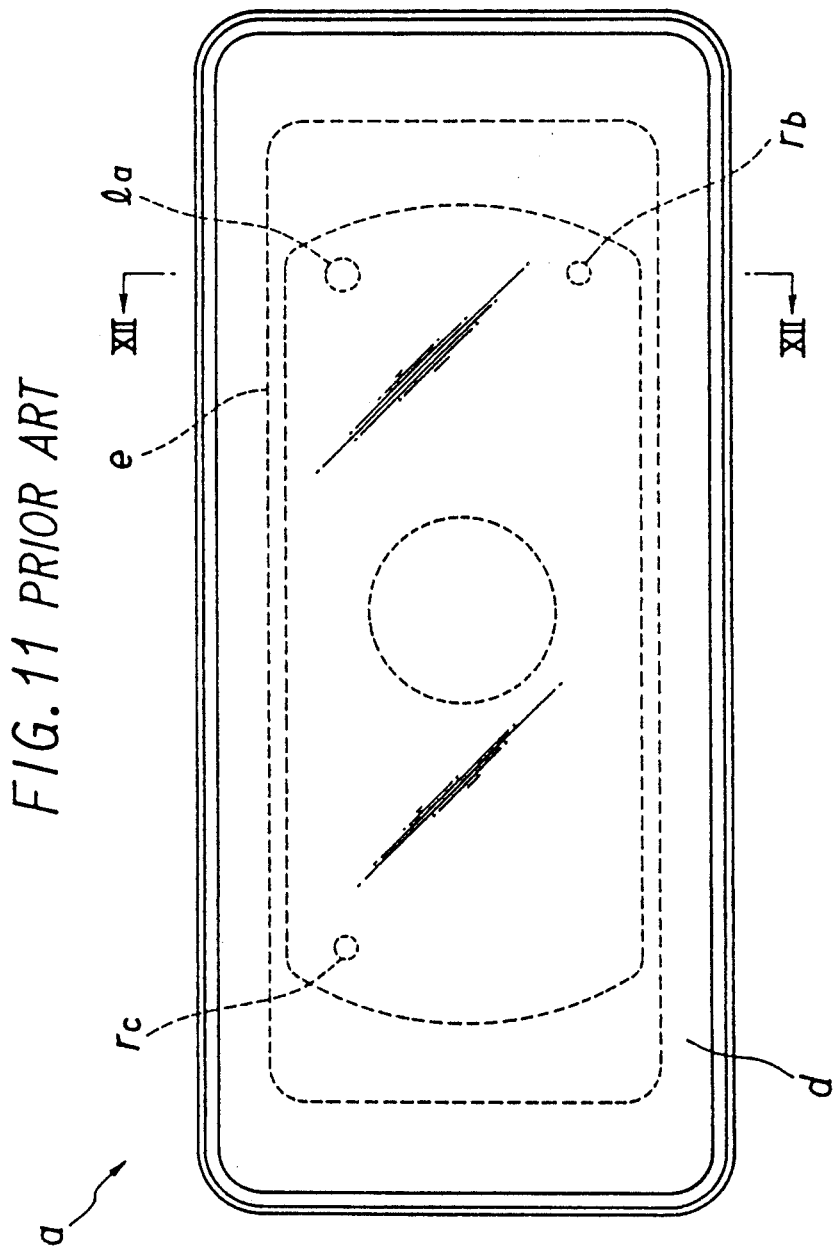
FIG. 11 is a front view of a prior art automobile headlight.
Figure 12:
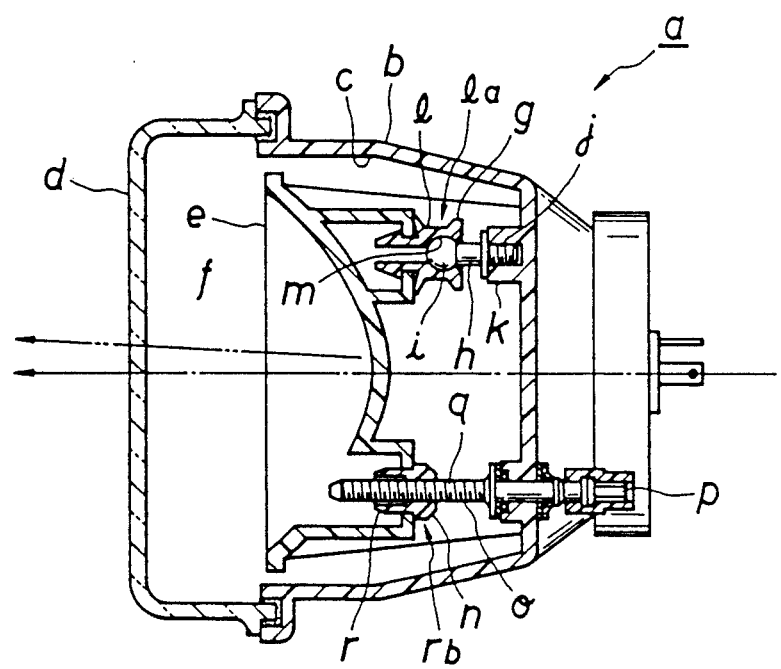
FIG. 12 is a section view taken along line XII—XII in FIG. 11 showing a prior art.
Figure 13:
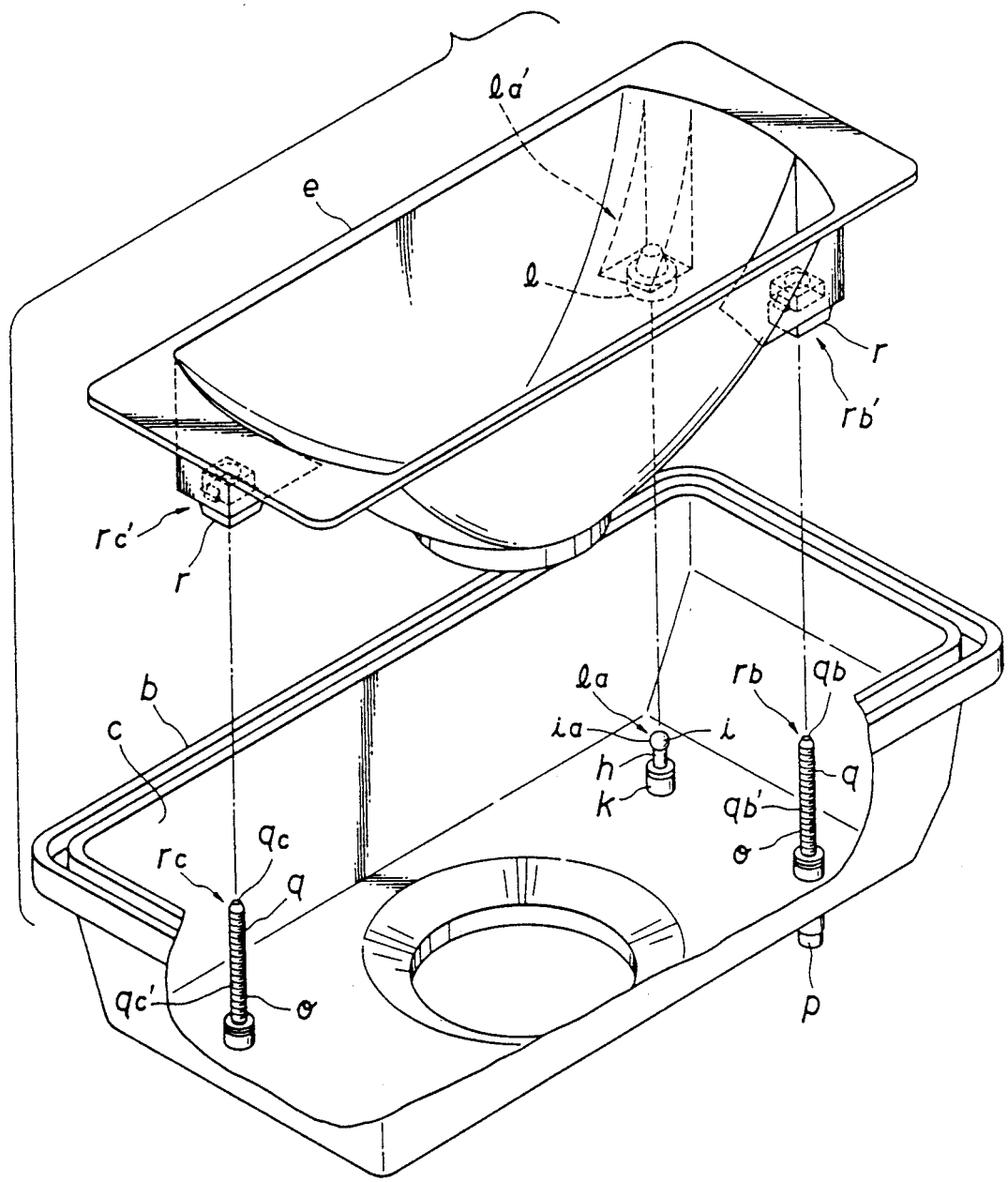
FIG. 13 is a perspective view of a reflective mirror and a lamp body prior to the assembling operation.

A boss 6 is formed near to one corner thereof to project from the inner (front) surface of the rear wall 4 and, a bore 6a is formed in the boss 6. Generally circular (as viewed from the front) projecting protions 7 and 7 are formed on the inner surface of the rear wall 4 at positions near to a corner spaced lower from the first mentioned one corner and near to another corner spaced in the side direction from the first mentioned one corner. Respective projecting portions 7 and 7 have openings 7a and 7a, and have annular ridges 7b and 7b on the outer circumference thereof. A mounting groove 8 is formed in the front edge of the lamp body 2 as shown in FIGS. 2 and 3.

SUPPORT SHAFT (FIGS. 2, 6 AND 8)

A support shaft 9 is mounted on the boss 6 of the lamp body 2. The shaft 9 is integrally formed of a metal and has a flange 9a on the intermediate portion, a screw-thread portion 9b on the rear portion and a spherical portion 9c on the front end. The screw-thread portion 9b is threaded into the bore 6a in the boss 6 of the rear wall 4 of the lamp body 2 so that the shaft 9 projects forward from the rear wall 4.

ADJUST SHAFT (FIGS. 2, 4, 7 AND 8)

Two adjust shafts 10 and 10 are respectively supported rotatably on the lamp body 2. Since the shafts 10 and 10 are identical the description will be made with respect to only one of them.

A flange 11 is formed on the intermediate portion of the length of the adjust shaft 10, and a screw-thread portion 12 is formed on the portion forward of the flange 11. Two lengthwise spaced annular projections 13a and 13b are formed rearward of the flange 11, and each annular projection has an inclined rear surface and a generally orthogonal front surface. Further, a portion 14 rearward of the rear projection 13b has a generally hexagonal cross-section.

A slide washer 15 formed of a synthetic resin material is fitted on the adjust shaft 10 to engage with the rear surface of the flange 11, and an O-ring 16 is fitted on the adjust shaft 10 to engage with the rear surface of the slide washer 15.

A portion rearward of the flange 11 of the adjust shaft 10 is inserted through the opening 7a in the rear wall 4 of the lamp body 2 with the O-ring 16 being located inner side of the annular projection 7b in the projection 7. At this condition, a portion of the adjust shaft 10 between the annular projection 13a and the rear end of the adjust shaft 10 projects rearward of the rear wall 4 of the lamp body 2.

Shown at 17 is a washer which is fitted on the adjust shaft 10 on the front side of the annular projection 13a and rear side of the rear wall 4 of the lamp body 2.

Shown at 18 is a push on fixture of a circular ring shaped configuration and being formed of a metal. A plurality of engaging pieces 18a, 18a, ... are formed to project radially inward as shown in FIG. 4B. The fixture 18 is fitted on the adjust shaft 10 from the rear end so that the engaging pieces 18a, 18a, ... ride over the annular projection 13a from the rear side and is located on the front surface of the annular projection 13a. Thus the adjust shaft 10 is retained on the rear wall 4 of the lamp body 2 and is rotatably supported on the rear wall 4 of the lamp body 2.

Shown at 19 is a cap being formed of a synthetic resin material and has a generally hexagonal tubular shape. The front half portion 19a of the cap 19 has an inner and outer diameters respectively larger than that of the rear half portion 19b. Two equally spaced slits 20 and 20 are formed in the front half portion 19a such that a radially inward resilient force is given on the front half portion 19a. On the inner circumference of the front half portion 19a there are formed engaging pawls 21 and 21 as shown in FIG. 4B, and the front surfaces of the pawls 21 and 21 are formed into inclined surfaces 21a and 21a so that the pawls 21 and 21 can easily ride over the annular projection 13b of the adjust shaft 10 and engage the front surface of the annular projection 13b and the cap 19 is retained on the adjust shaft 10 when the cap 19 is pushed on the rear end portion 14 of the adjust shaft 10 in the forward direction. The inner diameter or the configuration of the rear half portion 19b is nearly equal to that of the rear end portion 14 of the adjust shaft 10. Thus, the adjust shaft 10 can easily be rotated by applying the torque on the cap 19.

NUT (FIGS. 2, 5 AND 7)

Shown at 22 is a nut, which is formed of a synthetic resin material into a generally rectangular block like configuration. The nut 22 has, as shown in FIG. 4B, a generally rectangular opening 23 in the front half portion and a screw-thread hole 24 in the center portion of the rear half. The opening 23 is substantially larger than the hole 24. In opposite side walls of the front half portion of the nut 22 there are formed there are formed generally lateral U-shaped slits so as to define resilient pieces 25 and 25. The thickness of each resilient piece 25 increases in the rear direction such that the thickness is nearly equal to that of remaining portion of the front half portion 23 at the front end, and is larger than that of the portion 23 at the rear end 25a of the resilient piece 25 as shown in FIG. 4A. Namely, the outer surface of the resilient piece 25 defines an inclined surface and, projects from the outer surface of the front half portion of the nut 22.

Shown at 26 and 26 are projections projecting from the opposite side surfaces of the rear half portion of the nut 22 and define a suitable distance between the rear ends 25a and 25a of the resilient pieces 25 and 25. These projections 26 and 26 and the rear ends 25a and 25a and the outer side surfaces 27a and 27a of the nut 22 define respectively engaging grooves 27 and 27. The grooves 27 and 27 have convex bottom surfaces as viewed vertically.

The screw-thread portion 12 of the adjust shaft 10 is threaded into the hole 24 of the nut 22 by a desired amount. The position of the nut 22 with respect to the adjust shaft 10 is determined such that a plane defined by engaging grooves 27 and 27 of the two nuts 22 and 22 and the spherical portion 9c of the support shaft 9 is generally orthogonal to an axis extending in fore and aft direction of the headlight.

REFLECTIVE MIRROR (FIGS. 2~4, AND FIG. 7)

The reflective mirror 28 is formed of a synthetic resin material and has a recessed reflective surface 29.

A mounting portion 30 is formed on the rear surface of the reflective surface 29 at the position near to one corner thereof. The mounting portion 30 has a generally rectangular column like shape and having in the rear surface a circular mounting hole 30a.

Two mounting portions 31 and 31 are also formed on the rear surface of the reflective surface 29 at the positions spaced respectively laterally and vertically from the mounting portion 30. The mounting portion 31 and 31 have also generally rectangular column like shape and have rectangular mounting holes 31a and 31a in the rear surfaces respectively.

An electric bulb mounting hole 32 is formed in the central portion of the reflective surface 29.

RECEPTACLE MEMBER (FIGS. 2, 6 AND 7)

A receptacle member 33 is formed of a synthetic resin material and has integrally a supported portion 34 of the front half and a receptacle portion 35 of the rear half. A spherical recess 36 is formed in the receptacle portion 35 which opens in the rear direction and a plurality (preferably three equally spaced) of slits 37, 37 and 37 are formed in the spherical wall of the recess 36 to afford resiliency so that an open edge 36a of the recess 36 can expand radially outward. A resilient flange (or projections) 38 is formed on the front edge of the receptacle portion 35.

The supported portion 34 consists of two spaced apart supported legs 39 and 39 which extend forward from the front end of the receptacle portion 35. The supported legs 39 have in the outer surfaces of the base portions engaging grooves 40 and 40. The outer surfaces 41 and 41 of the legs 39 and 39 and in front of the grooves 40 and 40 define a conically inclined surface the diameter of which is decreasing in the forward direction.

The supported legs 39 and 39 of the receptacle member 33 are inserted into the mounting opening 30a of the mounting portion 30 of the reflective mirror 28. When the legs 39 and 39 are inserted into the opening 30a the inclined surfaces 41 and 41 are pressed radially inward such that the legs 39 and 39 approach to each other, and when the engaging grooves 40 and 40 respectively engage with the opening 30a the legs 39 and 39 return to their original positions due to the resiliency. At that time, the resilient projections 38 and 38 resiliently engage with the rear surface of the mounting portion 30.

Thus, the receptacle member 33 is snappingly mounted on the mounting portion 30 by simply pushing the receptacle member 33 in axially forward direction.

A plane defined by the open edge 36a of the spherical recess 36 and two mounting holes 31a and 31a is generally orthogonal to an axis extending along the fore and aft direction of the headlight 1 of the neutral position.

MOUNTING THE REFLECTIVE MIRROR ON LAMP BODY (FIG. 7)

The reflective mirror 28 is located relative to the lamp body 2 by facing the rear surface of the reflective mirror 28 with the front surface of the lamp body 2, by facing the open edge 36a of the spherical recess 36 of the receptacle member 33 supported on the reflective mirror 28 with the spherical portion 9c of the support shaft 9, and by inserting portions of respective adjust shafts 10 and 10 extending in front of respective nuts 22 and 22 into respective mounting openings 31a and 31a of the reflective mirror 28 with the front end portions of respective nuts 22 and 22 being fitted in respective mounting openings 31a and 31a.

Then, the reflective mirror 28 is forcively pushed in of the reflective mirror 28 with the front end portions of respective nuts 22 and 22 being fitted in respective mounting openings 31a and 31a.

Then, the reflective mirror 28 is forcively pushed in the direction extending along the axis of the headlight whereby the spherical portion 9c of the support shaft 9 expands the spherical recess 36 of the receptacle member 33 and is fitted therein, and respective nuts 22 and 22 are fitted in respective mounting openings 31a and 31a with the resilient pieces 25, 25, . . . being resiliently deformed in passing through the openings 31a and 31a.

The reflective mirror 28 is tiltably mounted on the lamp body 2 with respective nuts 22 and 22 being threaded into respective adjust shafts 10 and 10 by desired amount so as to locate the reflective mirror 28 at the neutral position at which the central axis or the optical axis of the reflective mirror 28 will generally align with the central axis of the lamp body 2 and, no additional adjustment such as threading the adjust shaft 10 or 10 into or out of the nut 22 or 22 in the initial stage is not required.

LENS, ELECTRIC BULB . . . (FIGS. 1~3, AND FIG. 7)

An electric bulb 42 is mounted in the electric bulb mounting hole 32, and a water proof cover 43 is mounted between the bulb 42 and the central opening 5 in the lamp body 2.

A lens 44 having integrally a front surface portion 44a and a circumferential wall portion 44b which extends rearward from the circumference of the portion 44a. The rear end portion of the circumferential wall portion 44b is fitted in the mounting groove 8 in the lamp body 2 and is secured thereto by a bonding agent 45 or the like.

MODIFIED SUPPORT STRUCTURE (FIG. 8)

FIG. 8 shows a modified support structure for mounting the adjust shafts 10 and 10 on the lamp body 2.

The washer 17 and the metal push on fixture 18 in the first embodiment are substituted by a push on fixture 46 formed of a synthetic resin material such as MC nylon.

The fixture 46 has a thick thickness ring shaped form and has a central bore 46a having equally spaced three axially extending grooves 46b, 46b and 46b. Further, on the front edge, three equally spaced resilient pieces 47, 47 and 47 are formed on the circumference to project in inclined radially outward and forward direction.

The fixture 46 is mounted on a portion of the adjust shaft 10 extending rearward of the rear wall 4 of the lamp body 2. Due to the resiliency of the material of the fixture 46 and to that afforded by the grooves 46b, 46b and 46b in the bore 46a, the fixture 46 will ride over sequentially two annular projections 13b and 13a and engages with the front surface of the projection 13a and engages with the front surface of the projection 13a and the resilient pieces 47, 47 and 47 resiliently abut with the rear surface of the rear wall 4 of the lamp body 2.

Shown at 48 is an annular ridge formed on the rear surface of the rear wall 4 so as to encircle the push on fixture 46.

SECOND EMBODIMENT (FIGS. 9 AND 10)

FIGS. 9 and 10 show the second embodiment showing the assembling method according to the present invention.

The second embodiment is different from the first embodiment in that the receptacle member is mounted on the support shaft beforehand.

As shown in FIG. 9, a restricting projection 49 is formed on the front end of the spherical portion 9c of the support shaft 9 so as to restrict the amount of the tilting movement of the support shaft 9 relative to the receptacle member 33. In particular, when the receptacle member 33 tilts excessively relative to the support shaft 9 with the spherical portion 9c of the support shaft 9 being rotatively received in the spherical recess 36 of the receptacle member 33, the projection 49 will engage with the inner surface of a bore 33a in the receptacle member 33 thereby restricts the inclination angle $\theta$ (FIG. 10). The angle $\theta$ is determined to permit the minimum angle of inclination of the reflective mirror 28 for attaining the adjustment of the illuminating angle of the headlight 1.

The supported portion 34 of the receptacle member 33, which is mounted on the support shaft 9 beforehand, is directed generally in the forward direction. Thus, it is easy to insert the front end of the supported portion 34 of the receptacle member 33 into the mounting hole 30a of the reflective mirror 28 and, at the same time, to insert the front ends of respective nuts 22 and 22 into the openings 31a and 31a in the reflective mirror 28. By simply pressing the reflective mirror 28 rearward, the receptacle member 33 is mounted in the mounting opening 30a and the nuts 22 and 22 are mounted in the mounting hole 31a and 31a respectively.

ADVANTAGES OF THE INVENTION

As described heretofore, according to the invention, it is possible to assemble the reflective mirror with the lamp body by locating respective mounting portions of the reflective mirror with corresponding mounting portions of the lamp body and by forcively pushing the reflective mirror rearward. Further, the nuts can be threaded previously onto threaded shaft by predetermined amount it is possible to assemble the reflective mirror at the neutral position relative to the lamp body.

It will be understood that the invention shall not be limited to the embodiments described as above and, it is easy for those skilled in the art to apply various changes or modifications within the scope of the invention which is defined by the claims.

We claim:

1. A method for assembling a headlight which includes a lamp body having a recess being open in the front direction and a lens covering the front opening of the recess, and a reflective mirror tiltably mounted on the lamp body, the method comprising steps of supporting rotatively two adjustment shafts respectively on the lamp body with the rear end portions thereof projecting from the rear surface of the lamp body, mounting respectively on screw-thread portions of the adjust shafts nuts having on the outer side surfaces resilient portions respectively, mounting a support shaft having a spherical portion on the front end on the lamp body, supporting a receptacle member having a spherical recess opening in the rear direction on the reflective mirror, supporting respectively two mounting members having mounting openings respectively on the reflective mirror, arranging the opening of the recess of the receptacle member to correspond to the spherical portion of the support shaft and the mounting openings of the mounting members to correspond respectively the nuts, and pushing the reflective mirror in the rear direction so that the spherical portion of the support shaft is fitted in the spherical recess in the receptacle member and the nuts are respectively fitted and retained in the mounting openings of the mounting members, whereby the reflective mirror is mounted tiltably on the lamp body.

2. A method for assembling a headlight according to claim 1, wherein the nuts are threaded preliminary on respective adjustment shafts by predetermined amount such that said push on step is performed with the optical axis of the reflective mirror aligning generally with the fore and aft axis of the lamp body.

3. A method for assembling a headlight which includes a lamp body having a recess being open in the front direction and a lens covering the front opening of the recess, and a reflective mirror tiltably mounted on the lamp body, the method comprising steps of supporting rotatively two adjustment shafts respectively on the lamp body with the rear end portions thereof projecting from the rear surface of the lamp body and screw-thread portions of the front portions of the adjust shafts extending in the forward direction, respectively mounting on screw-thread portions of the adjustment shafts nuts being formed of synthetic resin material and having respectively on the outer side surfaces resilient portions, mounting a support shaft having a spherical portion on the front end on the lamp body, fitting on the support shaft a receptacle member having a spherical recess corresponding to the spherical portion of the support shaft and having resilient pieces thereon, forming three mounting openings in the reflective mirror with two of them corresponding respectively with said two nuts and the remaining one corresponding to the receptacle member, and pushing the reflective mirror in the rear direction so that the nuts are respectively fitted and retained in the mounting openings in the reflective mirror and the resilient pieces of the receptacle member is fitted and retained in remaining one mounting opening in the reflective mirror, whereby the reflective mirror is mounted tiltably on the lamp body.

4. A method for assembling a headlight according to claim 3, wherein the nuts are threaded preliminary on respective adjustment shafts by predetermined amount such that said push on step is performed with the optical axis of the reflective mirror aligning generally with the fore and aft axis of the lamp body.

5. A headlight apparatus including a lamp body having a recess being open in the front direction and a lens covering the front opening of the recess, and a reflective mirror tiltably mounted on the lamp body; the apparatus comprising two spaced apart adjustment shafts which are respectively supported rotatively on the lamp body with the rear end portions thereof projecting from the rear surface of the lamp body, that screw-thread portions are formed respectively on the front portions of the adjust shafts to engage with nuts respectively, that the nuts have respectively on the outer side surfaces resilient retaining means, that a support shaft having a spherical portion on the front end is mounted on the lamp body at the position being spaced from respective adjust shafts, said spherical portion being adapted to engage with a spherical recess in a receptacle member which is adapted to be mounted on the reflective mirror, and that two mounting members respectively having mounting openings are supported on the reflective mirror, said mounting openings are adapted to receive resiliently and retain the nuts respectively when the nuts are forcefully pushed into the mounting openings.

6. A headlight apparatus according to claim 5, in which said nuts have respectively non-circular cross-section and said mounting openings have correspondingly non-circular cross-section.

7. A headlight apparatus according to claim 5, in which said non-circular cross-section is generally rectangular form and said resilient pieces are formed integrally on opposite side surface of the nuts.

8. A headlight apparatus according to claim 5, in which said receptacle member having said spherical recess is fixedly mounted on the reflective mirror, and said spherical recess is adapted to snappingly receive the spherical portion of the adjust shaft by forcively pushing the receptacle member toward the adjust shaft.

9. A headlight apparatus according to claim 5, in which said receptacle member having said spherical recess has a non-circular front half portion having at least one resilient retaining piece, said front half portion being adapted to snappingly engage with a non-circular opening in a the mounting member which is fixedly mounted on the reflective mirror.

* * * * *